(12) United States Patent
Gustafsson et al.

(10) Patent No.: US 6,494,302 B2
(45) Date of Patent: Dec. 17, 2002

(54) METHOD, ARRANGEMENT AND USE FOR AND OF, RESPECTIVELY, A VANE DAMPER

(75) Inventors: Leif Gustafsson, Holmsjö; Lars Jansson, Enskede, both of (SE)

(73) Assignee: Ohlins Racing AB, Vasby (SE)

( * ) Notice: Subject to any disclaimer, the term of this patent is extended or adjusted under 35 U.S.C. 154(b) by 0 days.

(21) Appl. No.: 09/734,165

(22) Filed: Dec. 12, 2000

(65) Prior Publication Data

US 2001/0000887 A1 May 10, 2001

Related U.S. Application Data

(62) Division of application No. 09/161,311, filed on Sep. 28, 1999, now Pat. No. 6,220,407.

(30) Foreign Application Priority Data

Sep. 30, 1997 (SE) .............................................. 9703542

(51) Int. Cl.⁷ .................................................. F16F 9/14
(52) U.S. Cl. .................... 188/307; 280/281.1; 180/227; 29/888.025
(58) Field of Search ................................ 188/307, 308, 188/309, 310; 29/888.025, 888.02; 280/281.1, 283, 284, 285; 180/219, 227

(56) References Cited

U.S. PATENT DOCUMENTS

| 1,506,495 A | 8/1924 | Macrae | |
|---|---|---|---|
| 1,521,602 A | 10/1925 | Derihon | |
| 3,976,245 A | 8/1976 | Cole | 236/93 |
| 4,773,514 A | 9/1988 | Gustafsson | |
| 4,913,255 A | 4/1990 | Takayangi et al. | 180/227 |
| 5,586,780 A | 12/1996 | Klein et al. | 280/275 |
| 5,816,356 A | 10/1998 | Jannson et al. | 180/227 |

FOREIGN PATENT DOCUMENTS

| EP | 0 725 004 | 8/1996 |
|---|---|---|
| GB | 705624 | 3/1954 |
| GB | 2250056 | 5/1992 |
| JP | 2-190635 | 7/1990 |
| WO | WO 86/03267 | 6/1986 |

OTHER PUBLICATIONS

Patent abstracts of Japan JP–5–57387, Manufacture of Aluminum Products, vol. 17, No. 365 (M–1442) [5994].

*Primary Examiner*—Pam Rodriguez
(74) *Attorney, Agent, or Firm*—Connolly Bove Lodge & Hutz LLP

(57) ABSTRACT

A vane damper, and a method for making the vane damper is disclosed. A casing including a space for at least one rotable vane divides the space into two parts. The spaces are variable because of the vane which rotates within the space. Further, a number of asymmetrical ducts connects the spaces separated by the vane with a gas accumulator space so that a medium within the spaces for damping motion of the vane can expand into the gas accumulator space against the force of a gas. The vane is produced by extruding aluminum or an aluminum containing alloy. The vane is sealed against the surfaces of the space as well as a bearing member supporting the vane.

5 Claims, 4 Drawing Sheets

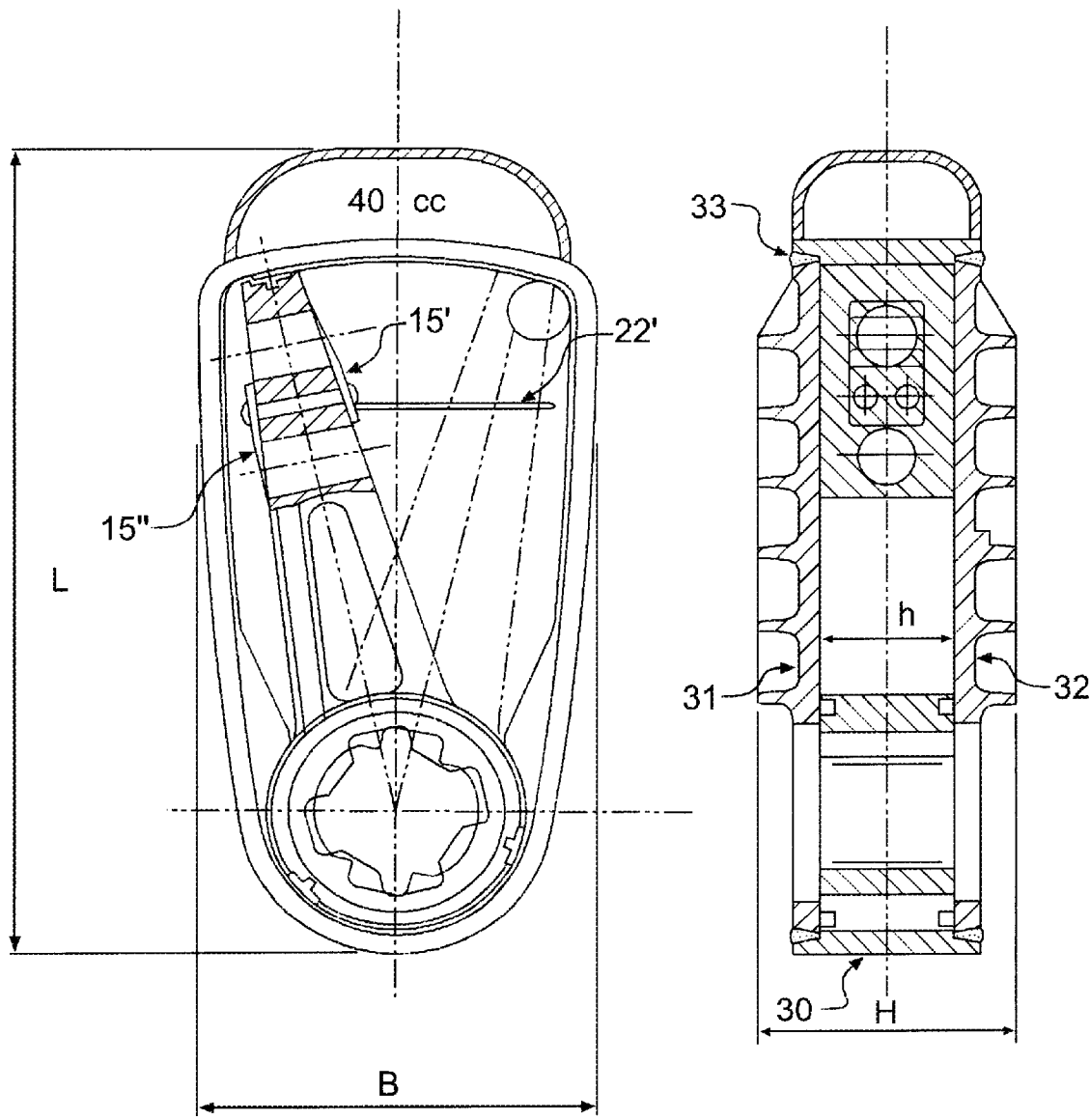
FIG. 2  FIG. 2a

METHOD, ARRANGEMENT AND USE FOR AND OF, RESPECTIVELY, A VANE DAMPER

RELATED APPLICATION

The present application is a divisional of U.S. patent application Ser. No. 09/161,311, filed Sep. 28, 1999 now U.S. Pat. No. 6,220,407.

FIELD OF THE INVENTION

The present invention relates to a method of producing a vane damper which comprises a body with a space for at least one rotatable vane which divides the space into two part spaces located on either side of the vane. Because of the rotatability of the vane, the spaces are variable. The vane is mounted in the body by means of a bearing member and operates in a working medium (hydraulic oil) which is located in the space. Via one or more passages or throttle functions, the working medium can be transferred between the variable part spaces to produce the damping characteristic of the shock damper. The invention also relates to a vane damper itself and also an arrangement for a vane damper and use of one or more extruded aluminium or alloy products which can be cut in order to produce units.

BACKGROUND OF THE INVENTION

Vane damper constructions are known. For example, it is previously known, in connection with steering gear, for motorcycle handlebars for example, to use vane dampers in order to counteract forceful steering movements. In connection with toilet seats, it is also previously known to use vane dampers in connection with seats which can be raised and lowered. The known vane dampers are each provided with one or more spaces, in which one or more vanes operate. The body of the vane damper also has a bearing space for the bearing part of the vane, which part may comprise a cylindrical part, by means of which the vane can be rotated in a cylindrical recess. The cylindrical part has a projecting spindle or equivalent member which is intended to engage in a part in the vehicle or equipment which is to be damped (shock-damped) in its movements.

SUMMARY OF THE INVENTION

Problems of space often arise in connection with vehicles and equipment which are to be provided with shock dampers. In cars for example, the so-called packing problem for components is significant. Conventional shock dampers are tied to a certain given shape (elongate shape) which, in various connections, it is desirable to be able to change and vary to a great extent so that the shock dampers in the vehicle do not encroach on the passenger or baggage space, for example, or force the car constructor to depart from the shape of the external design desired. The possibility of changing or varying the external shape and dimensions of the shock damper must not be exploited at the expense of the functioning of the shock damper. The present invention aims to solve this problem.

It is moreover desirable to be able to reduce the weights of shock dampers considerably. In the case of particularly low-consumption vehicles, every reduction in weight is important. In this connection, the overall effect of reduction of the weight of the vehicle is to be taken into account. It is not only the advantages which can be achieved by weight reduction in the shock damper itself but also the resultant effects from the point of view of weight reduction which apply for the vehicle as a whole thanks to the shape of the shock damper that are to be borne in mind. As far as weight reduction on the shock damper itself is concerned, there is a requirement to be able to reduce the weight of the shock damper by 20–40%. The invention solves these problems also.

There is also a requirement to be able to make more efficient and automate to a great extent the manufacture of modern shock dampers. Shock dampers for vehicles constitute a so-called mass product which must be supplied rapidly and efficiently at the same time as the shock damper function can maintain the high level of functioning and performance aimed for. The invention solves these problems also.

In connection with the new shock dampers, it is important to be able to avoid suction cup effects between the movable vane and walls opposite the latter in the body space. Furthermore, it is to be possible to avoid the release of air and of light fractions in the working medium used. The accumulator function, permits the working medium to expand and contract according to temperature changes in the shock damper and its surroundings, must be able to function in spite of demands for new geometries and reduced external dimensions. The invention solves these problems also.

It must be possible for the mounting of vane dampers in the vehicle concerned to be clear and to function well. It must be possible to carry out machining of the interacting surfaces between the pivotable vane and the relevant surfaces of the body very easily. The interacting surfaces must be easily accessible for machining tools during manufacture and it must be possible to reduce the amount of machining/treatment itself as well as the size of the surfaces which are to be machined. The invention solves these problems also.

It is also important that the shock damper function itself can be performed in a rational manner so that the desired damping characteristics and functions can be maintained. The action of the bleed function arrangement for reducing damping forces in the case of small movements must be long-term and not easily stopped up by products in the working medium. The invention solves these problems also.

It is to be possible for the new shock dampers to operate with a long service life and require little or no service. The invention solves this problem also.

A method according to the invention can be considered to be mainly characterized in that the vane with associated bearing member is produced by means of extruding aluminium or alloy, in that the extruded product is cut for production of the respective vane with associated bearing member and in that the respective vane is provided with sealing members which establish a seal against the relevant surfaces of the space and of the bearing member.

In one embodiment of the inventive idea, the tubular side wall of the body is also made by extruding aluminium or alloy. The extruded side wall product is cut to produce the respective body side wall and side parts sealing the space are fixed to the respective cut side wall. The parts can be fixed by means of adhesive bonding, rivets, bands, welding etc. In a further embodiment, only certain parts of the surfaces of the body, which interact with the movable surfaces of the vane, are sealed. In the bottom part of the body, a recess or a groove can be formed, which makes it possible for the working medium, for the purpose of performing the bleed function, to pass between the part spaces within a first operating range of the vane. Within this operating range, the vehicle or corresponding equipment concerned is provided with damping by the shock damper when the vehicle or equivalent is subject to a small load or a small force. In a second operating range of the vane, the latter operates beyond the groove to provide stronger damping, that is to say without the bleed function, effected in the second operating range. This is advantageous in the case of loads in and great forces on the vehicle. In connection with production of the extruded product, asymmetrical ducts are formed, in the body, between the part spaces and a space which serves as a gas accumulator space, into which it is possible for the working medium to expand against the action or a gas medium located in the space and to contract with the aid of the gas medium.

A vane damper according to the present invention can be considered to be mainly characterized in that the body is, in its upper end part, designed with a second space which contains gas and in that the first and second part spaces are interconnected via one or more passages via which the working medium in the first space is afforded the possibility of expanding to the second space when the working medium expands and also the working medium in the second space has the possibility of being moved back to the first space with the aid of the gas when the working medium decreases in volume.

In a preferred embodiment, the one or more passages are designed to throttle the working medium more in a first direction from the first space to the second space than in a second direction from the second space to the first space.

A vane damper according to the present invention is mainly characterized in that, in the fully rotated position of the vane in a first direction, a first side part space remains so as to prevent adhesion effects between the mutually opposite surfaces of the vane and of the body and also release of air or light fractions in the working medium. In the fully rotated position in a second direction, a second side part space is present in order to prevent adhesion effects between the opposite surfaces in this case of the vane and of the body and also to prevent the release effects in the working medium.

A vane damper according to the invention can be considered to be mainly characterized in that there are arranged in the vane one or more continuous holes and one or more shims arranged at this or these hole(s), by means of which hole(s) a damping force/damping capacity/damping characteristic brought about by the vane can be effected. In or near the vane, one or more connections can also be arranged between the part spaces, which connections perform one or more bleed functions, for example one or more grooves arranged in the delimiting surface of the body, where different grooves and groove shapes can provide bleed functions of different nature.

An arrangement according to the invention can be considered to be mainly characterized in that only a part of the space inner surfaces undergoes machining which ensures an effective sealing function by means of sealing members.

One embodiment includes, among the space inner surface parts, a first curved space inner surface which is opposite the free end edge surface of the vane. The curved space inner surface is finished so as to ensure functionally reliable sealing by means of and via a sealing member. The sealing member is arranged at the curved surface and the front end edge surface, and is preferably fixed on the free end edge of the vane. The sealing is effected when the front edge of the vane sweeps over the curved inner space surface in the performance of its damping function/damping characteristic.

A further embodiment also includes curved inner space surfaces which are opposite an outer surface on a cylindrical bearing part belonging to the vane, by means of which part the vane is mounted in a circular space in the body. Only parts, for example between 10 and 30%, of the curved inner space surfaces are machined so as to bring about reliable sealing between the outer surface and the parts of the curved inner space surfaces with sealing strips, preferably located on or in the cylindrical bearing part, in between.

In a further embodiment, the side parts of the body, which, together with the tubular side wall of the body, are only partially machined (that is to say ground, polished etc.) to bring about reliable sealing between the upper and lower edges of the vane with sealing strips, preferably fastened to the vane, in between.

An arrangement according to the present invention can be considered to be mainly characterized in that the bearing unit of the vane is provided with a hole, in which a rotating member, for example a rotary spindle, belonging to a part (chassis, wheel, vehicle etc.) extends, the movements of which part are to be damped by the vane damper.

In one embodiment, the body is anchored in a vehicle or in a unit on or in which damping is intended to be performed by means of the vane damper, and the part which is to have its movements damped belongs to or is mounted in the vehicle/unit.

A use according to the invention can be considered to be mainly characterized in that the extruded aluminium or alloy product(s) which can be cut for production of units is characterized in that the product(s) is (are) used in order to produce as units a vane with associated bearing part, forming part of a vane damper, and/or a tubular side wall forming part of the body of a vane damper.

According to the above, a rational and functionally reliable vane shock damper can be produced at relatively low cost when the price and design of the vehicle are also taken into consideration. Great packing density can be achieved in the vehicle/equipment concerned thanks to a changed external variable geometry and often reduced external dimensions. Great reductions in weight on the shock damper itself can be achieved. Furthermore, weight reductions and design advantages can be achieved on the vehicle itself.

DESCRIPTION OF THE DRAWINGS

For the present proposed embodiment of the method, vane damper, arrangement and use according to the invention is to be described below with simultaneous reference to the accompanying drawings, in which FIG. 2 shows a vertical view of a second embodiment of a damper with a body and associated vane, FIG. 2a shows a vertical section from the side of the damper according to FIG. 2.

DETAILED DESCRIPTION OF THE INVENTION

Figure 1:
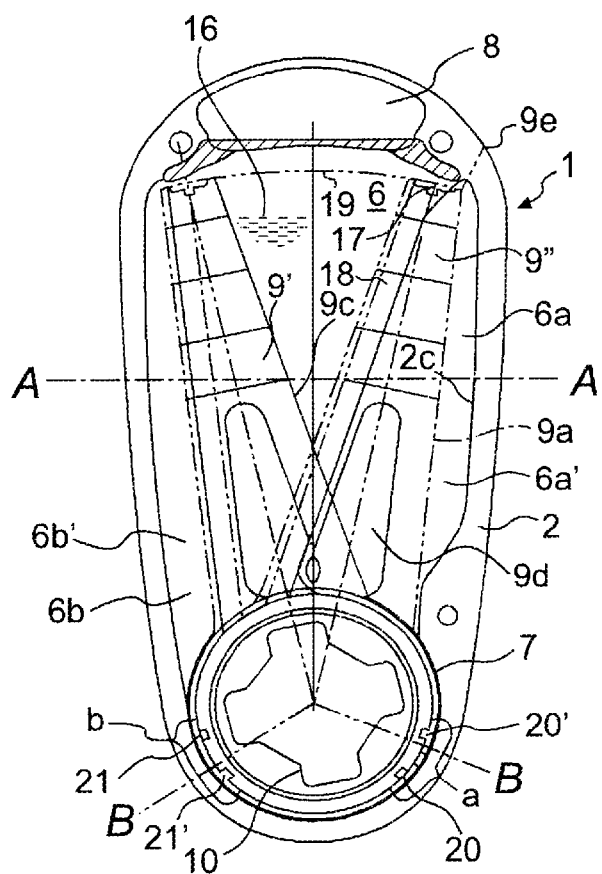
FIG. 1 shows a vertical view of a first exemplary embodiment of a vane damper with a body and a vane arranged therein.
Figure 1A:
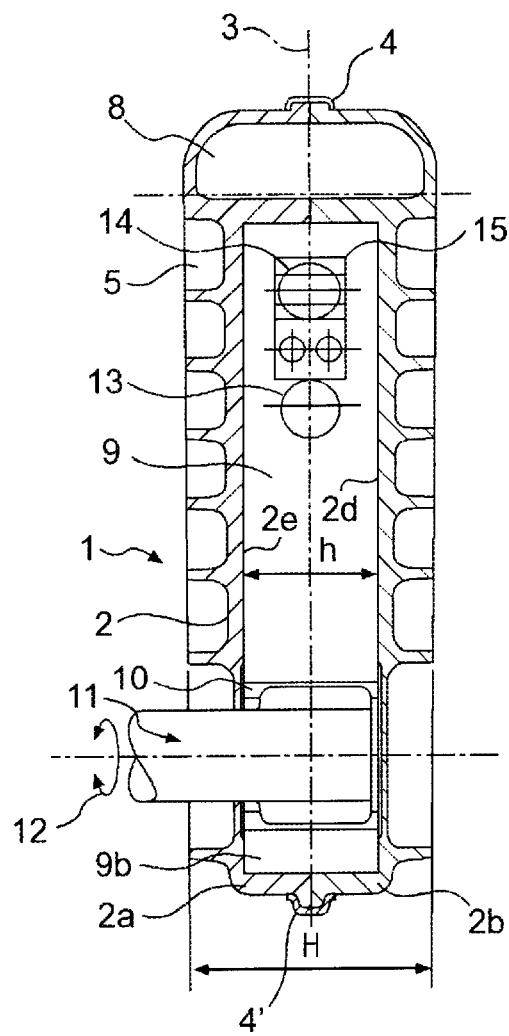
FIG. 1a shows a vertical section from the side of the vane damper according to FIG. 1.
Figure 1B:
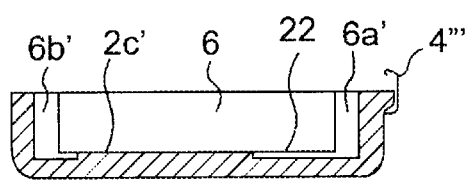
FIG. 1b shows a cross-section of the damper according to FIG. 1 along section line A—A.
Figure 1C:
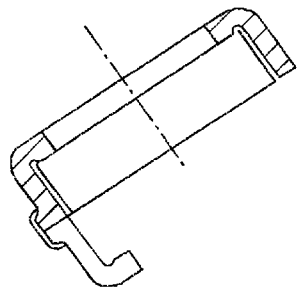
FIG. 1c shows a section B—B of the damper according to FIG. 1.

In FIGS. 1a and 1b, a vane damper/vane shock damper is indicated by 1. The body of the damper is indicated by 2. In principle, the body consists of two halves 2a, 2b which are assembled via a parting plane 3. The halves can be assembled by means of members which hold them together which are indicated by 4, 4'. The members can be in the form of a steel band but may also be in the form of adhesively bonded joints, rivets, welds etc. The halves are provided with weight-reducing recesses 5 on the outside. The body 2a, 2b contains a first space 6, a second space 7, which is connected to the space 6, and a third space 8. A vane 9 is arranged rotatably in the first space 6. The vane has a vane-shaped part 9a which operates in the space 6 in a working medium in the space, and a cylindrical part 9b which is mounted in the second space 7 which has a corresponding cylindrical shape for the cylindrical part 9b. The bearing part 9b has a continuous hole 10, via which coupling to a spindle 11 or equivalent member can take place. The spindle 11 (or the member) is connected to the unit via which the damping function is to be performed on a vehicle or equivalent (see below). The hole 10 has a "key grip" so that rotary movements 12 can drive the vane 9 relative to the body, or rather that the vane can exercise the damping capacity on the spindle 11 concerned and its movements 12.

The vane can move between two outer positions 9', 9". The vane may have passages for working medium. In the present case, the vane has two passages which may take the form of holes 13, 14 which pass through the material of the vane and at which shims (shim packs) 15 are arranged. The shims/shim packs are mounted on either side of the vane, only the shims/shim pack for one hole 14 are shown in the figure.

The vane is rotated relative to the body via the rotary function mentioned above. During rotation, the working medium 16 passes via the passages and the shims offer resistance to the rotary movement which gives the damper its characteristic. The bleed function, which affords a small amount of damping against small movements around zero, can also be arranged in or near the vane (see below). The vane 9a can be considered to divide the first space into two part spaces 6a, 6b on either side of the vane, which vary in size. In the outer positions, there are remaining part spaces 6a', 6b', which affords significant advantages by virtue of the fact that the respective side surface 9c (only one side surface is provided with a reference) on the vane does not come up against the opposite inner surface 2c in the body, which prevents suction cup effects, releases of air and light fractions in the working medium, etc. The vane has a weight-reducing recess 9d adjacent to the transition to the bearing part of the vane. The damper has a top side and a bottom side. The top side is in this connection directed upwards in the figure and the bottom side is accordingly directed downwards in the figure. The section of the damper shown in FIG. 1 is characterized by a long narrow unit which widens somewhat from the bottom parts upwards. The embodiment is highly integrated and the integration also applies to the first space 8 (see below). In the view according to FIG. 1, it can be seen that the vane damper is essentially rectangular.

At its free end 9e, the vane is provided with a sealing member in a recess 17 which is described in greater detail below. On the upper and lower sides also, the vane is provided with a sealing member/sealing strip 18 which seals against side surfaces 2e, 2d on the inside of the body. The sealing strips 18 are mounted eccentrically on the vane in the section according to FIG. 1 and run along one side edge of the vane, which is an advantage (see below).

The sealing member 17 seals against a curved surface/top surface 19 on the inside of the body. Close to the bearing member 9b, the cylindrical bearing housing of the vane is provided with two seals 20, 21 which are shown in two positions, the second positions having been indicated by 20' and 21' respectively. The seals 20 and 21 move along sealing surfaces a and b which together have a length, in the view according to FIG. 1, of roughly 10–30% of the total circumference of the bearing housing. One of the advantages of the construction shown is that only the side surfaces 19, 20 and 21 of the surfaces of the body extending towards the plane of the paper in FIG. 1 need to be finished (polished, ground etc.) to a given degree of fineness at which reliable sealing is guaranteed between the vane and the relevant surfaces of the body. Only limited parts of the surfaces 2c and 2d require further treatment with regard to degree of fineness. Those parts of the surfaces 2c, 2d which lie within the sealing member 18 in the two outer positions of the vane need to undergo machining corresponding to that of the side surfaces. No requirements exist for the remaining surfaces in the interior of the body. When the halves have been produced in a known manner by extrusion, the limited requirements for machining of the total number of inner surfaces in the body make manufacturing advantageous. The eccentricity of the mounting of the sealing member 18 means that machining in sharp corners can essentially be avoided and only needs to be carried out in one place. FIG. 1b shows that only 2c' needs to be treated. FIG. 1b also shows a groove extending in the transverse direction, which can be used as a bleed. By virtue of the fact that the groove extends only partially in the transverse direction, the vane can operate with two damping levels. When the vehicle or equivalent is subjected to great load or great force, it is often advantageous to effect stronger damping in the case of smaller movements also. By virtue of the vane operating on inner surfaces which do not have the transverse groove, the damping concerned can be made stronger in the case of movements around zero. On the other hand, in the case of relatively little load on the vehicle or vehicle forces acting on the same, it is often advantageous to make use of a bleed function which can be performed by means of the groove which extends over the relevant operating range of the vane in the case in question. FIGS. 1a and 1b also show that it is possible to avoid sharp corners on surfaces which are to be machined.

Figure 3:
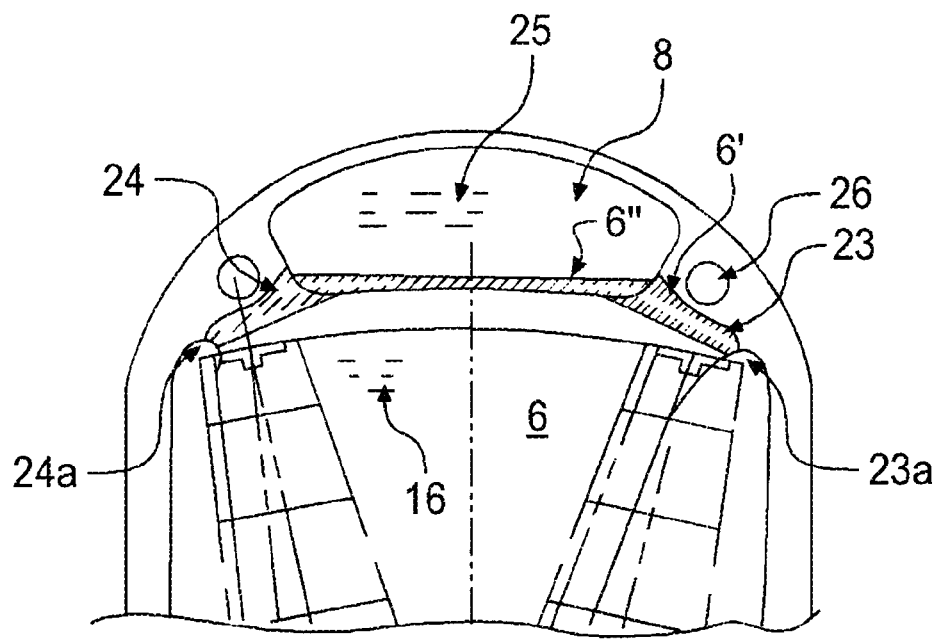
FIG. 3 shows an enlarged vertical view of parts of the damper according to FIG. 1.

According to FIG. 3, the body is also provided with ducts 23, 24 which are produced in conjunction with the extrusion and need to undergo only relatively little finishing. In the event of increases in temperature, the working medium 16 can be allowed to expand through the ducts into the space 8 against the action of gas pressure from a gas 25 which is confined in the space 8. FIG. 3 shows how the working medium 6' has been forced into the ducts 23, 24 and how the working medium 6' has also expanded into the space 8, all against the action of the gas 25. Conversely, the medium can be reduced in volume with the aid of the gas and returned completely or partially to the first space. In this way, the working medium is kept pressurized irrespective of the temperature involved, which counteracts air release, etc.

FIG. 3 also shows holes 26 for rivets which are used for the purpose of assembly. The holes are located in both the body halves concerned and run through these.

Figure 3A:
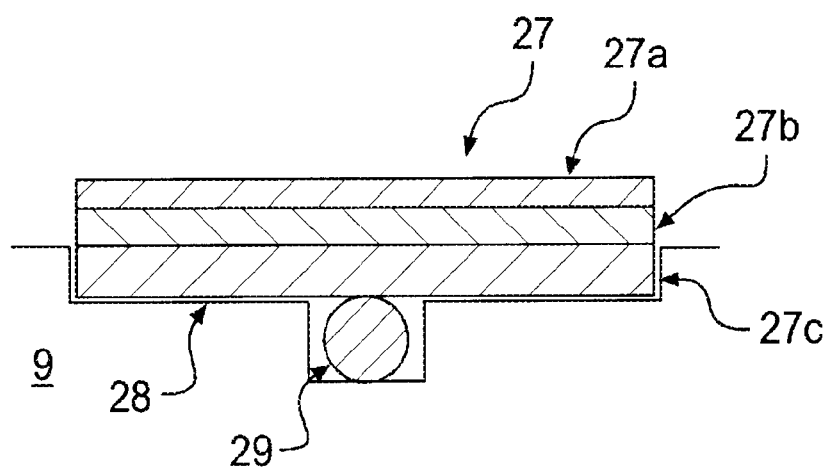
FIG. 3a shows a cross-section of the construction and placement of a sealing member/sealing strip which is used in the embodiments according to FIGS. 1 and 2.

FIG. 3a shows the type of strip which is used on the vane according to the above. The strip 27 consists in a known manner of various layers, teflon 27a, bronze 27b and steel 27c. The strip is mounted in its recess 28 in the vane against the action of a ring 29 arranged on the underside. The ring also prevents medium being conducted under the strip.

FIG. 2 shows a second embodiment, in which both shim packs 15', 15" are shown. The groove 22' which is used for the bleed function is also shown. In the case shown, the body is formed by a tubular side wall, see FIG. 2a, which can be extruded and cut to the correct height dimensions. Side parts 31, 32 are mounted on the side walls by means of welding 33. Alternatively, adhesive bonding is used, together with the rivets, steel bands, etc.

The vane has a height h, which in the exemplary embodiment, is roughly 25 mm and a total height H of roughly 50 mm. The length L is roughly 170 mm and the width at the widest point roughly 77 mm, that is to say the vane damper construction is extremely compact.

Figure 4A:
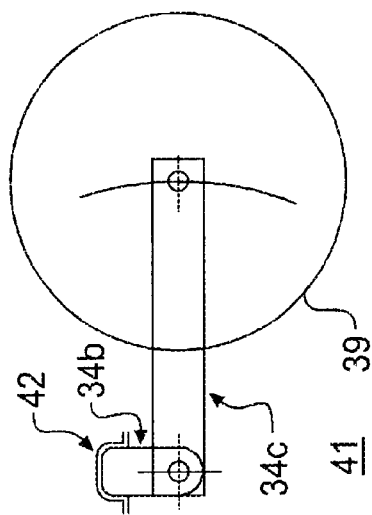
FIG. 4a shows parts of the wheel suspension according to FIG. 4 seen from the side.
Figure 4:
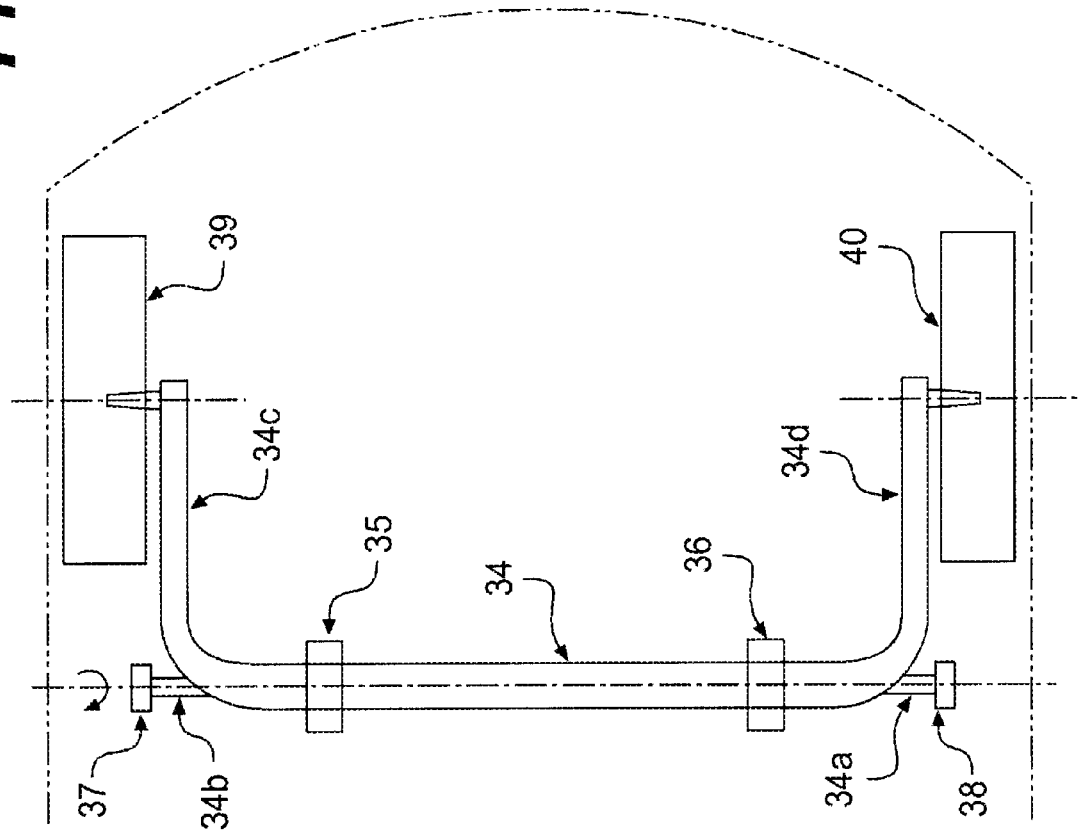
FIG. 4 shows in principle and from below the mounting of the vane dampers in a wheel suspension in a vehicle.

FIG. 4 shows in principle a wheel suspension from the underside of a vehicle. A frame 34 is mounted firmly in bearings 35, 36 and has in its central part projecting spindles 34a, 34b, on which the vane dampers 36, 37 according to the above are mounted with their upper parts extending up perpendicularly in the plane of the paper. The spindles 34a, 34b correspond to the spindle 11 in FIG. 1a. The wheels 39, 40 are in principle suspended on or at the ends of the parts 34c and 34d respectively, which extend essentially perpendicularly from the central part 34. FIG. 4a shows the mounting of the vane damper in a side view, the body being anchored on the chassis 41 via an anchoring member 42.

As far as the flow of the working medium between the spaces 6 and 8 is concerned, the shapes of the passages cause the working medium to be throttled more in the case of flow from the space 6 to the space 8 than in the other direction. This is because, at the throttle parts 23a, 24a (see FIG. 3), the passages widen outwards towards the space 8, the ducts 23 and 24 being widest at their opening into the space 8.

According to the above, extruded aluminium or alloy products can thus be used in order to produce a vane or vane parts for vane dampers and/or tubular side walls which form part of the body of the vane damper.

The respective vane is, in the sectional view according to FIG. 1, assigned a shape which tapers from the bearing housing towards the free end. Close to the bearing housing, the vane has the weight-reducing recesses 9d and, in the front, tapering part, the vane has the passages and shims/shim packs and, if appropriate, holes which perform the bleed function.

The invention is not limited to the embodiment illustrated above by way of example but can be modified within the scope of the inventive idea.

What is claimed is:

1. A method of producing a vane damper comprising a casing including a space for at least one rotatable vane that divides the space into two part spaces that are located on either side of the vane, the spaces being variable because of the rotatability of the vane, the vane being mounted in the casing by a bearing member and operating in a working medium that is located in the space, the working medium being transferable between the variable spaces via a passage or at least one throttle function to produce damping, the method comprising:

producing the vane with the associated bearing member by extruding aluminum or aluminum-containing alloy;

providing the vane with sealing members for establishing a seal against surfaces of the space and of the bearing member;

making two bilaterally symmetrical tubular halves of the casing by extruding aluminum or aluminum-containing alloy;

cutting the extruded products forming the casing halves, vane, and bearing member to remove excess material; and attaching the two halves to form the casing enclosing the vane damper.

2. The method according to claim 1, wherein:

the casing halves are attached with adhesive bonding, rivets, bands, or welding.

3. The method according to claim 1, further comprising:

forming a recess or groove in the casing halves, the recess or groove permitting the working medium to pass between the part spaces within a first operating range of the vane for performing a bleed function, wherein in the first operating range a small load or small force is damped in a vehicle using the vane damper, and wherein in a second operating range the vane operates beyond the groove, so that the bleed function cannot be obtained, to effect stronger damping.

4. A method of producing a vane damper comprising a casing including a space for at least one rotatable vane that divides the space into two part spaces that are located on either side of the vane, the spaces being variable because of the rotatability of the vane, the vane being mounted in the casing by a bearing member and operating in a working medium that is located in the space, the working medium being transferable between the variable spaces via a passage or at least one throttle function to produce damping, the method comprising:

producing the vane with the associated bearing member by extruding aluminum or aluminum-containing alloy;

providing the vane with sealing members for establishing a seal against surfaces of the space and of the bearing member; and forming, in conjunction with the production of the casing, a number of asymmetrical ducts between the part spaces and a gas accumulator space, wherein it is possible for the working medium to expand into the gas accumulator space against the action of a gas medium located in the gas accumulator space which applies a pressure against said working medium.

5. A vane damper, comprising:

a casing including a first space and a second gas-containing space interconnected with the first space via at least one passage which throttles the working medium more in a direction from the first space to the second space than in a direction from the second space to the first space;

at least one rotatable vane arranged in the first space and dividing the first space into two part spaces located on either side of the vane, the rotatability of the vane varying the size of the spaces; and a working medium arranged in the first space for expanding to the second space against the force of gas in said gas containing space when the working medium expands, and moving back to the first space by the force of gas when the working medium decreases in volume by a force produced by said gas.

* * * * *